United States Patent [19]
Jackson

[11] Patent Number: 5,613,814
[45] Date of Patent: Mar. 25, 1997

[54] LATCHING MECHANISM FOR SECURING SHIPPING CONTAINERS ON TRANSPORT VEHICLES

[76] Inventor: Robert G. Jackson, P.O. Box 277, Benton Harbor, Mich. 49022

[21] Appl. No.: 508,354

[22] Filed: Jul. 27, 1995

[51] Int. Cl.⁶ ...................................................... B60P 7/13
[52] U.S. Cl. ................................. 410/70; 410/69; 410/73
[58] Field of Search ............................... 410/69, 70, 71, 410/72, 73, 76, 77, 80; 248/681, 500, 503; 292/109, 121

[56]             References Cited
       U.S. PATENT DOCUMENTS

| 3,508,501 | 4/1970 | Nagy | 410/76 |
| 3,774,551 | 11/1973 | Sweger | 410/70 |
| 3,827,375 | 8/1974 | Terlecky et al. | 410/70 |
| 4,430,032 | 2/1984 | Morgan | 410/70 X |
| 4,431,368 | 2/1984 | Katz et al. | 410/69 X |
| 5,106,247 | 4/1992 | Hove et al. | 410/73 |

FOREIGN PATENT DOCUMENTS 2849829  6/1979  Germany ............................... 292/121

Primary Examiner—Karen B. Merritt
Assistant Examiner—Stephen Gordon
Attorney, Agent, or Firm—Baker & Daniels

[57] ABSTRACT

A latching mechanism for retaining a shipping container on a transport vehicle includes a fixed support and a latching member mounted on the fixed support for engagement into a latching receptacle on the container. A pivot pin slidably engages a pivot surface on the latching member, and an alignment pin slidably engages a wedging or camming surface on the latching member, thereby causing the latching member to rotate into the released position when loads are applied along the axis of the latching member. A spring yieldably urges the latching member to the latching or engaged position after the latching receptacle moves past a pawl on the end of the latching member.

9 Claims, 4 Drawing Sheets

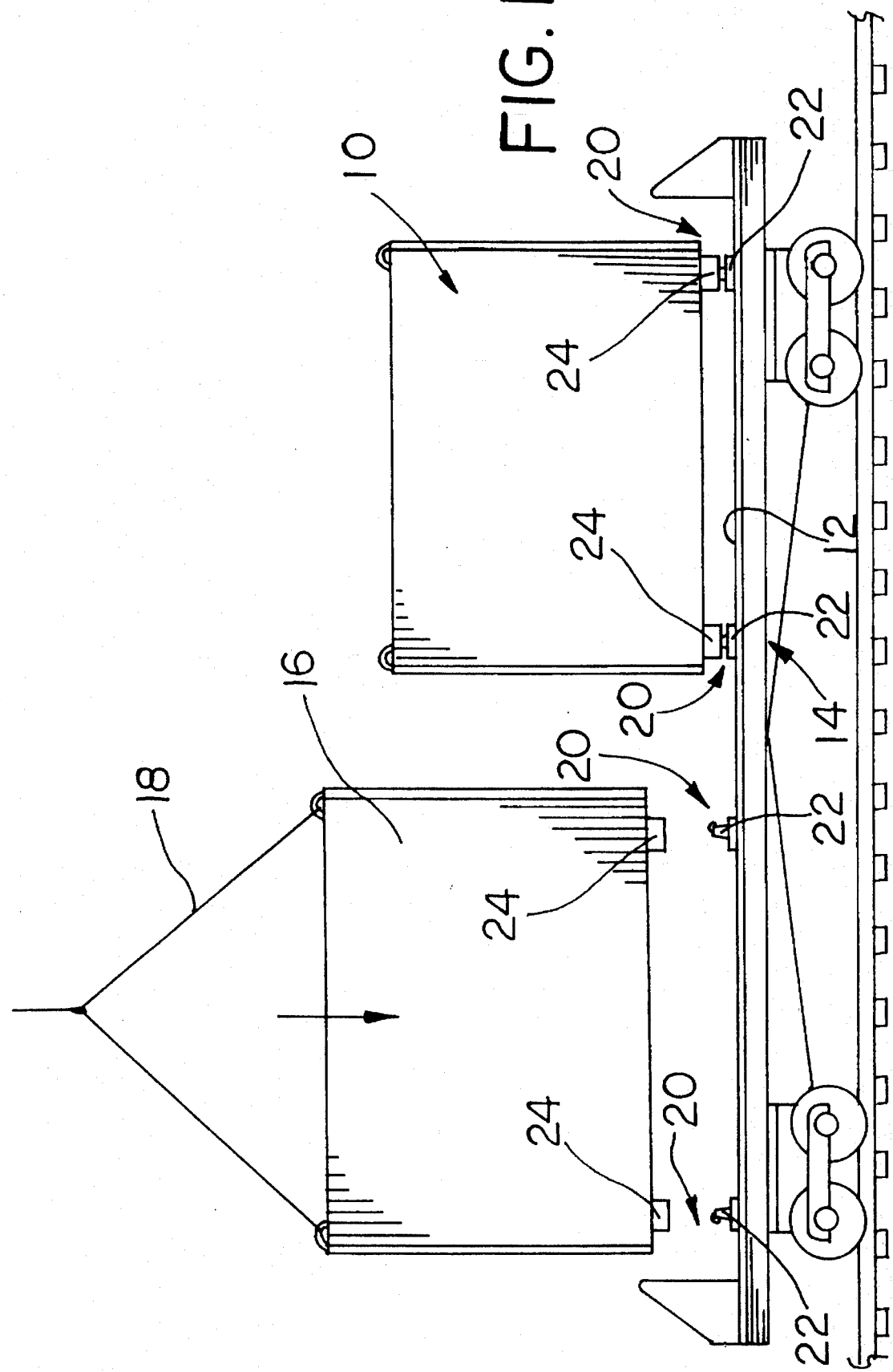

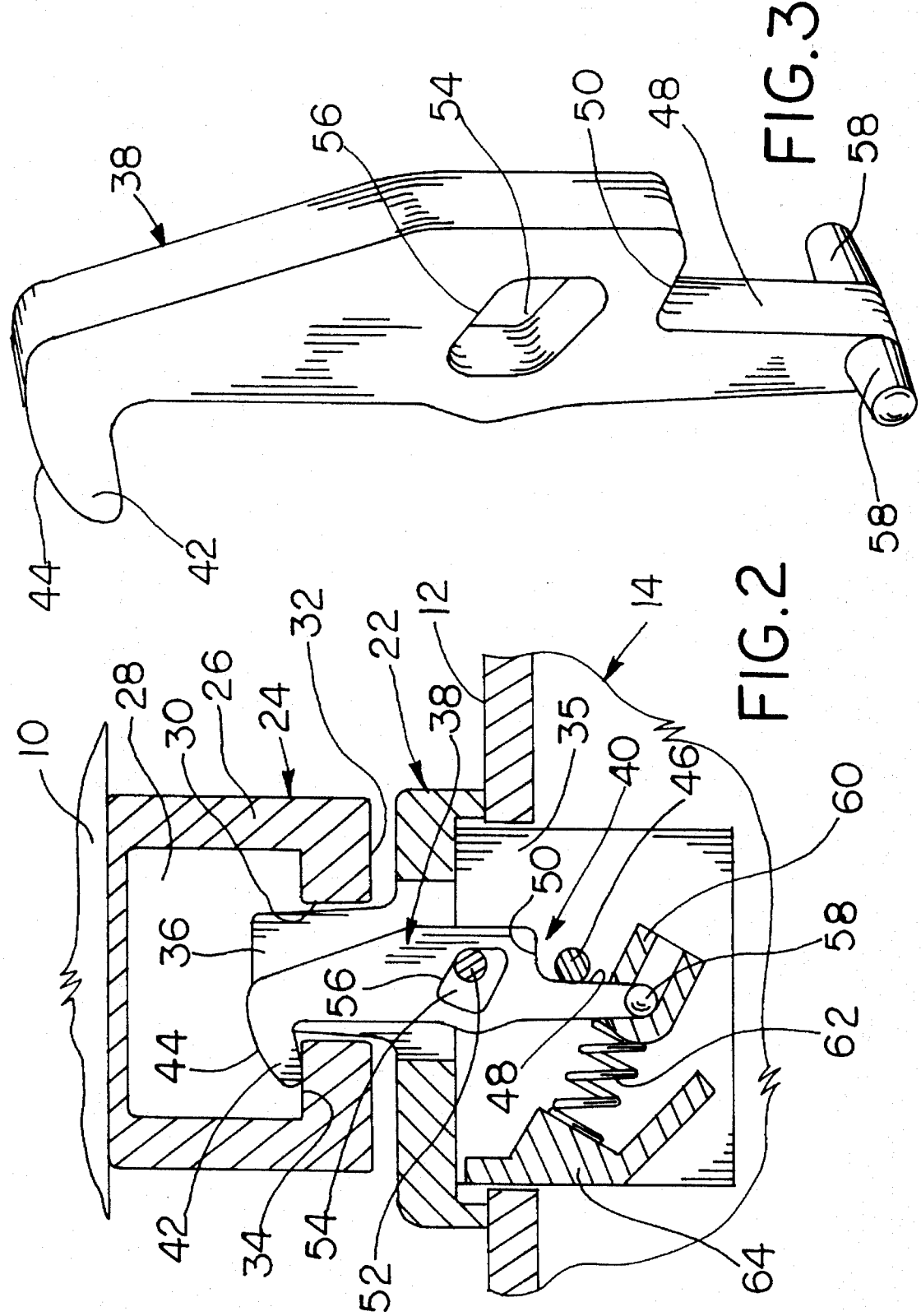

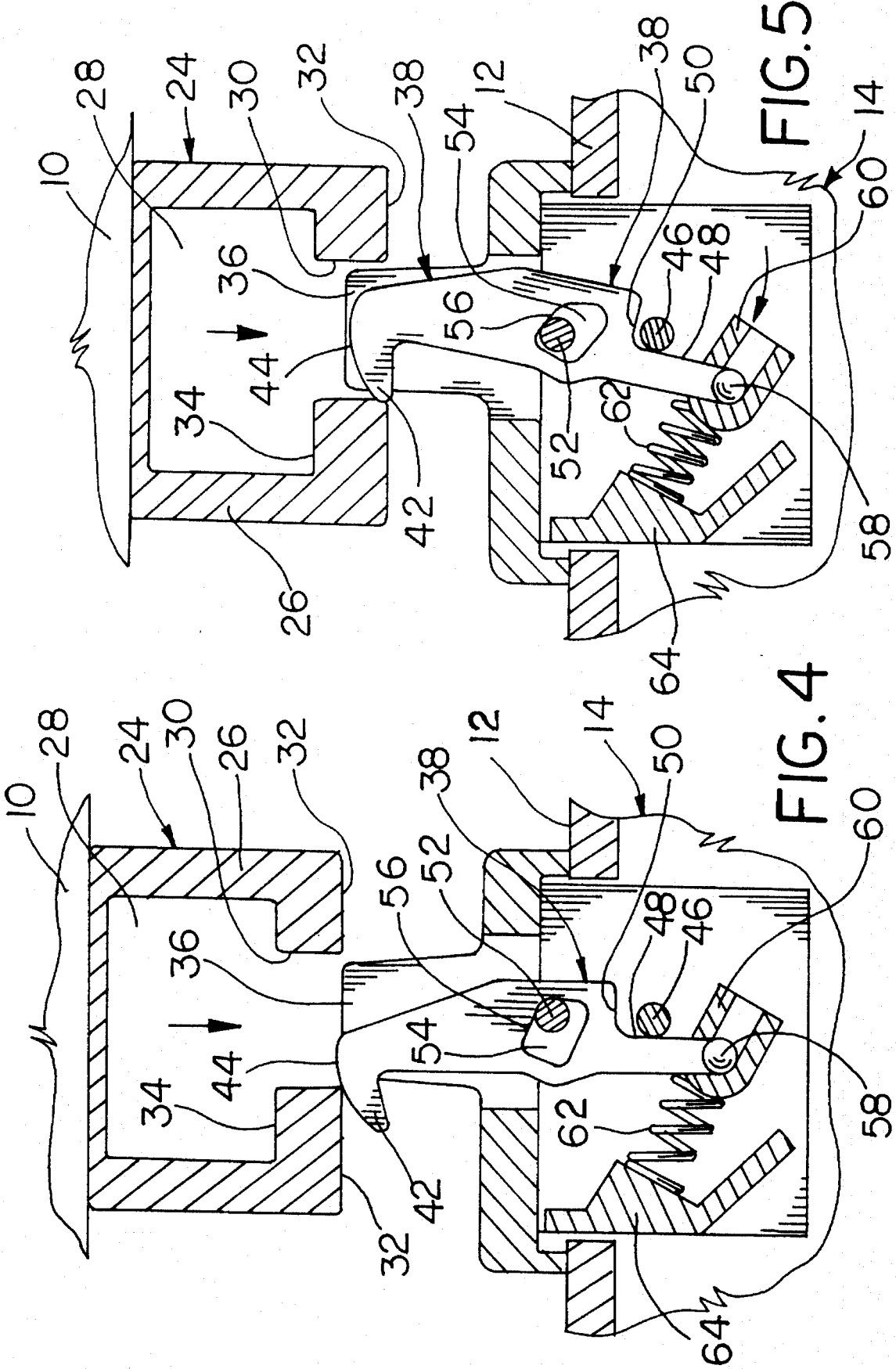

LATCHING MECHANISM FOR SECURING SHIPPING CONTAINERS ON TRANSPORT VEHICLES

This invention relates to a latching mechanism for securing intermodal shipping containers on transport vehicles.

Intermodal shipping containers are large (8 feet by 8 feet by 40 feet is a typical size) and, when loaded, may weigh several tons. Such shipping containers must often be transferred to and from transport vehicles, such as railroad cars. Automatic latching mechanisms are installed in the corners of railroad cars designed to transport intermodal shipping containers. These latching mechanisms include a spring-loaded latch member which is adapted to engage a latching receptacle provided on the corresponding corners of a shipping container. The shipping containers are transferred to and from the railroad car by large cranes. The operator is often at a substantial distance from the container, but must be able to position the container precisely over the railroad car and lower it into place in order to secure the shipping container to the railroad car. However, in prior art devices, if the shipping container does not engage the latching mechanism on the railroad car in precisely the correct place, the latching mechanism could easily be damaged or broken.

The latch member includes a curved surface which is engaged by the latching receptacle to rotate the latch member in order to permit the latch member to enter the latching receptacle. Accordingly, the shipping container must be centered so that the latching receptacle will engage the latching member along the curved surface, which is offset from vertical. If the latching member is loaded vertically, the pins about which the latching member pivots may be broken or damaged, thereby rendering the latching member inoperable. In the present invention, the latch member is rotated even when the latch member is loaded vertically, thereby preventing damage to the latching member regardless of where the latching receptacle engages the latching member. Accordingly, damage to the latching mechanism is avoided.

These and other advantages of the present invention will become apparent from the following description, with reference to the accompanying drawings, in which:

FIG. 1 is a side elevational view of a railroad car and shipping containers incorporating the latching mechanism of the present invention illustrating the manner in which shipping containers are lowered and latched onto the railroad car for transport;

FIG. 2 is a fragmentary cross-sectional view taken through the latching mechanism retaining the shipping container to the transport vehicle, and illustrating the latch member engaged with the latching receptacle;

FIG. 3 is a view in perspective of the latch member illustrated in FIG. 2;

FIG. 4 is a view similar to FIG. 2 but illustrating the latching mechanism just as the latching receptacle is lowered into a position engaging the latch member;

FIG. 5 is a view similar to FIGS. 2 and 4 but illustrating that latching member rotated to its released position as the latching receptacle is lowered over the latch member.

Figure 6:
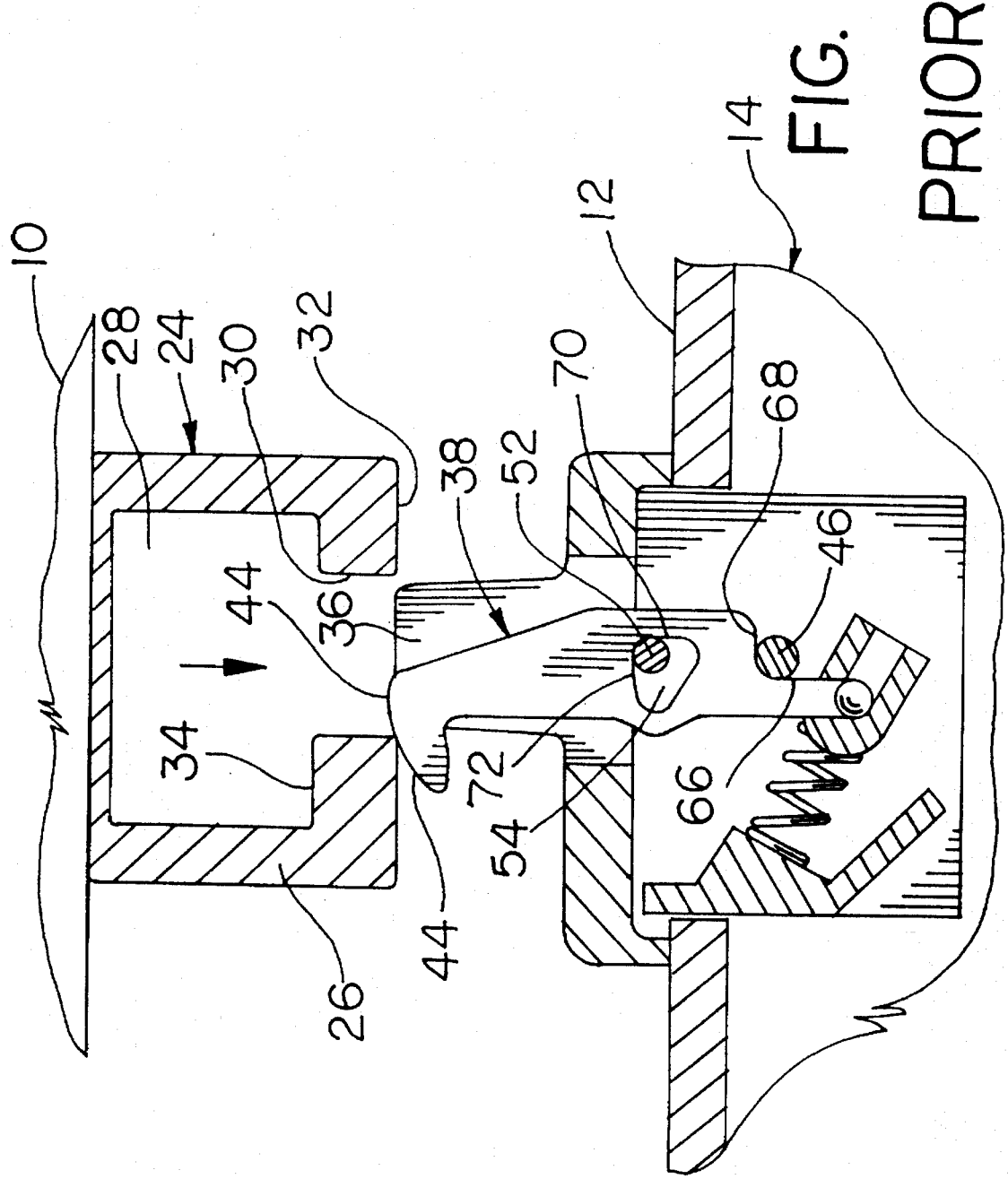
FIG. 6 is a view similar to FIG. 4, but illustrating a prior art device.

Referring now to FIG. 1 of the drawings, a first shipping container 10 is illustrated latched in place on the bed 12 on a conventional railroad car 14. A second container 16 is shown being loaded in place of the bed 12 by cables 18 controlled by a crane (not shown). Each of the containers 10, 16 are held in place on the bed 12 by latching mechanisms generally indicated by the numeral 20. The latching members 20 include a latching assembly 22 mounted on the bed 12 and a latching receptacle 24 on the container 10 or 16. Conventionally, latching receptacles 24 are provided at each corner of the container 16, and the latching assemblies 22 are provided at corresponding locations on the bed 12 such that the latching assemblies engage the latching receptacles 24 automatically as the containers 10 or 16 are lowered into place on the bed 12.

Referring now to FIGS. 2–5, the latching receptacle 24 includes a housing 26 defining a cavity 28 therewithin which is accessed through a slot 30 in the lower surface 32 of the housing 26. The cavity 28 defines a latching surface 34.

Latching assembly 22 includes a fixed support 35. Fixed support 35 includes a pair of guides (only one of which is shown at 36) that enter the receptacle 24 through the slot 30. A latching member generally indicated by the numeral 38 is pivotally mounted between the guides 36 by mounting means generally indicated by the numeral 40. One end of the latch member 38 terminates in a pawl 42 that is adapted to engage the engagement surface 34 to thereby latch the compartment 10 onto the rail car 14. The latching member 38 is movable as will hereinafter be explained from the latching position illustrated in FIG. 2 to the released position illustrated in FIG. 5. The latching member 38 further includes a curved surface 44 which, as illustrated in FIG. 4, is adapted to be engaged at a lower surface 32 as the container 10 is lowered onto the rail car 14.

Mounting means 40 includes a pivot pin 46 which is mounted on the fixed support 35 and extends generally transverse to the latching member 38. The pivot pin 46 is slidably engaged by a pivot surface 48 on the latching member 38. As will be described hereinafter, the latching member 38 is able to slide in a generally vertical direction relative to the pivot pin 46 as it rotates thereabout. A limit surface 50 is defined on the latching member 38 extending from the pivot surface 48. Accordingly, the latching member 38 moves the surface 50 toward and away from the pivot pin 46 as the pin 46 slides along pivot surface 48. In the latched position, as illustrated in FIG. 2, there is a substantial clearance between the surface 50 and the pivot pin 46, thereby allowing substantial vertical movement of the latching member 38 as it pivots counter-clockwise toward the released position illustrated in FIG. 5.

Mounting means 40 further includes an alignment pin 52 which is also supported by the fixed support 35 and extends transversely with respect to the latching member 38 substantially parallel to the pivot pin 46. The alignment pin 52 is received within an oversized aperture 54 in the latching member 38. The aperture 54 includes an obliquely extending wedging or camming surface 56 which slidably engages the alignment pin 52. The wedging or camming surface 56 extends obliquely with respect to vertical and horizontal.

The end of the latching member 38 opposite the end carrying the pawl 42 carries a pair of oppositely extending spring engagement members 58. Spring engagement members 58 are engaged by a spring retainer 60 which is engaged by one end of each of a pair of heavy-duty springs, only one of which is shown at 62. The opposite ends of the springs 62 engage a member 64 which is a part of the fixed support 35.

In operation, the springs 62 yieldably urge the latching member 38 into the latched position as illustrated in FIGS. 2 and 4. As illustrated in FIG. 4, as the container 10 is lowered onto the bed 12, the lower surface 32 of the receptacle 24 engages curved surface 44 of the latching member 38 and forces the latter downwardly viewing the figures. The alignment pin 52, due to its engagement with the wedging or camming surface 56, causes the downward movement of the latching 38 to be translated into clockwise rotation of the latching member, toward the released position as illustrated in FIG. 5. As the latching member moves downwardly, the latching member 38 pivots about pivot pin 46 as the alignment pin 52 moves along the camming or wedging surface 56. The pivot pin 46 approaches the surface 50, but surface 50 is spaced from the pin 46 a sufficient distance that the pin 46 never engages the surface 50. As the latching member rotates into the released position illustrated in FIG. 5, the spring 62 is gradually compressed.

When the latching member 38 is rotated into the released position illustrated in FIG. 5, the pawl 42 of the latching member 38 moves through the slot 30 and into the latching receptacle 24. When the pawl 42 moves into the cavity 28, the spring 62 yieldably urges the latching member 38 in a counter-clockwise direction, thereby returning the latching member 38 to the latching position illustrated in FIG. 2 in which the pawl 42 engages the latching surface 34 of the receptacle 24, thereby locking the container 10 onto the car 14. The length of the latching member 38 is substantially greater than its width or thickness, and the axial force is applied along the length by engagement of the surface 44 with the surface 32 causes the aforementioned rotation of the latching member 38.

Referring now to FIG. 6, which illustrates a latching mechanism typical of the prior art, elements the same or substantially the same as those in the FIGS. 1–5 retain the same reference character. In the prior art latching mechanism, pivot pin 46 and alignment pin 52 engage the juncture between surfaces 66, 68 and 70, 72 respectively. Rotation of the latching member 38 was affected entirely by engagement of the surface 32 of receptacle 24 with the curved surface of 44 of the latching member 38. However, as discussed above, it is difficult for the crane operator to position the container 16 in exactly the proper position for the surface 32 to engage the surface 44. When the receptacle 24 is lowered into a position such that the surface 32 engages that portion of the surface 44 along the vertical axis of the latching member 38, vertical forces were transmitted directly to the pins 46 and/or 52, sometimes bending or breaking the pins. However, in the present invention, with the sliding engagement of the pivot 46 with the surface 48 and with the camming action of the engagement of the alignment pin 52 with the camming or wedging surface 56 of the present invention, even vertical loading of the latching member 38 causes the latter to rotate, thereby assuring proper operation of the device without breakage of the component parts.

I claim:

1. Latching mechanism for retaining a shipping container on a transport vehicle comprising a fixed support, a latch member for engagement with a latching receptacle, mounting means for mounting said latch member on said fixed support for permitting movement in both a rotational direction and in another direction other than the rotational direction from a latched position to a released position and then back into said latched position as said latch member engages with and latches to said latching receptacle, and a spring yieldably urging said latch member toward said latched position, said mounting means including a pivot pin mounted on said fixed support, said latch member including a pivot surface slidably engaging said pivot pin and a limit surface, said pivot pin sliding along said pivot surface toward said limit surface as the latch member moves from said latched position to said released position and away from said limit surface as the latch member moves from said released position to said latched position, said mounting means including an alignment pin mounted on said fixed support, said latch member including an aperture receiving said alignment pin, said aperture having an obliquely extending camming surface engaging said alignment pin.

2. Latching mechanism as claimed in claim 1, wherein said latch member is an elongated member having length and width, said another direction being along the length of the latch member.

3. Latching mechanism as claimed in claim 1, wherein said another direction is substantially a vertical direction.

4. Latching mechanism as claimed in claim 1, wherein said alignment pin extends parallel to said pivot pin.

5. Latching mechanism for retaining a shipping container on a transport vehicle comprising a fixed support, a latch member for engagement with a latching receptacle, mounting means for mounting said latch member on said fixed support for permitting movement in both a rotational direction and in another direction other than the rotational direction from a latched position to a released position and then back into said latched position as said latch member engages with and latches to said latching receptacle, and a spring yieldably urging said latch member toward said latched position, said mounting means including a pivot pin mounted on said fixed support, said latch member including a pivot surface slidably engaging said pivot pin and a limit surface, said pivot pin sliding along said pivot surface toward said limit surface as the latch member moves from said latched position to said released position and away from said limit surface as the latch member moves from said released position to said latched position, said mounting means including an alignment pin mounted on said fixed support, said latch member including an aperture receiving said alignment pin, said aperture having an obliquely extending camming surface engaging said alignment pin, said aperture including sides defined by said latch member, one of said sides defining said camming surface.

6. Latching mechanism as claimed in claim 5, wherein said camming surface extends obliquely with respect to horizontal and vertical directions.

7. Latching mechanism for retaining a shipping container on a transport vehicle comprising a fixed support, a latch member for engagement with a latching receptacle, said latch member being mounted on said fixed support for movement from a latched position to a released position and then back into said latched position as said latch member engages with and latches to said latching receptacle, a pivot pin mounted on said fixed support, said latch member including a pivot surface slidably engaging said pivot pin and a limit surface, said pivot pin sliding along said pivot surface toward said limit surface as the latch member moves from said latched position to said released position and away from said limit surface as the latch member moves from said released position to said latched position, and a spring yieldably urging said latch member toward said latched position, said latch member being an elongated member having length and width, said latch member being movable relative to said pivot pin along the length of the latch member, an alignment pin mounted on said fixed support, said latch member including an aperture receiving said alignment pin, said aperture having an obliquely extending camming surface engaging said alignment pin.

8. Latching mechanism as claimed in claim 7, wherein said aperture includes sides defined by said latch member, one of said sides defining said camping surface.

9. Latching mechanism as claimed in claim 8, wherein said camming surface extends obliquely with respect to horizontal and vertical directions.

* * * * *